United States Patent [19]

Mitsui et al.

[11] 4,335,367

[45] Jun. 15, 1982

[54] ELECTRICALLY INSULATED COIL

[75] Inventors: Hisayasu Mitsui; Ryozi Kumazawa; Yoshiyuki Inoue; Shuichi Suzuki, all of Yokohama; Takeo Ito, Kawasaki; Sinichi Sanada; Shuzi Hayase, both of Yokohama, all of Japan

[73] Assignee: Tokyo Shibaura Denki Kabushiki Kaisha, Kawasaki, Japan

[21] Appl. No.: 178,154

[22] Filed: Aug. 14, 1980

[30] Foreign Application Priority Data

Aug. 17, 1979 [JP] Japan ................................ 54/104074
Aug. 17, 1979 [JP] Japan ................................ 54/104075

[51] Int. Cl.$^3$ ........................ H01F 27/32; B32B 19/00; B32B 27/38

[52] U.S. Cl. .............................. 336/205; 174/120.5 R; 336/206; 428/324; 428/363; 428/413; 428/417; 428/418; 428/429; 428/447; 428/454; 528/16; 528/27; 528/92; 428/473.5

[58] Field of Search ............... 428/324, 906, 413, 417, 428/418, 429, 447, 454, 363, 473.5; 528/92, 16, 27; 336/206, 205; 174/120.5 R

[56] References Cited

U.S. PATENT DOCUMENTS

| | | | |
|---|---|---|---|
| 3,618,753 | 11/1971 | Glasspoole | 428/324 |
| 3,624,032 | 11/1971 | Miyashiro | 528/107 |
| 3,926,885 | 12/1975 | Keil | 525/476 |
| 3,971,747 | 7/1976 | Bank | 525/476 |
| 4,013,987 | 3/1977 | Foster | 428/324 |
| 4,082,719 | 4/1978 | Liles | 528/16 |
| 4,237,262 | 12/1980 | Jones | 428/413 |
| 4,239,998 | 12/1980 | Hakamada | 428/324 |
| 4,244,911 | 1/1981 | Ishizaka | 428/324 |

FOREIGN PATENT DOCUMENTS

| | | | |
|---|---|---|---|
| 576099 | 5/1959 | Canada | 528/27 |
| 664200 | 6/1963 | Canada | 528/27 |
| 1801053 | 6/1970 | Fed. Rep. of Germany | 428/324 |
| 55-145724 | 11/1980 | Japan | 528/27 |
| 55-145725 | 11/1980 | Japan | 528/77 |

*Primary Examiner*—Ellis P. Robinson
*Attorney, Agent, or Firm*—Oblon, Fisher, Spivak, McClelland & Maier

[57] ABSTRACT

An electrically insulated coil is composed of a coil and a mica tape containing a first resinous composition, wound upon the coil; the resinous composition containing a maleimide compound, an epoxy resin, a curing catalyst consisting of an aluminum compound, and a curing accelerator selected from the group consisting of a silane compound having a hydroxyl group and a polysiloxane compound having a hydroxyl group; the curing catalyst and the curing accelerator each being in an amount of about 0.0001 to 5% by weight based on the total amount of the maleimide compound and the epoxy resin; and the resinous composition being cured by heating after the mica tape is wound around the coil.

The electrically insulated coil may further contain a second resinous composition comprising an epoxy resin and an acid anhydride, the second resinous composition impregnating the mica tape after the mica tape is wound around the coil, and being heat-cured together with the first resinous composition.

10 Claims, 4 Drawing Figures

ELECTRICALLY INSULATED COIL

The present invention relates to an electrically insulated coil obtainable by winding around a coil a mica tape which cures at a relatively low temperature and has a long storage life, providing a coil having excellent properties with respect to heat resistance, mechanical characteristics, and electrical insulation characteristics.

Recently, as electric appliances have been of a smaller size, there has been a growing demand for electrically insulated material possessing a higher resistance to heat so that there has been progress in the development of class H insulation continuously operable below 180° C. Heretofore, it was known that a heat-resistant resin for class H insulation includes an aromatic polyimide resin, a silicone resin or the like. The polyimide resin, however, employs a polar solvent so that its use may cause operating and sanitation problems. Furthermore, its final curing temperature is high and it produces water during the curing reaction so that the formation of a minute and elaborate insulating structure requires involved operational conditions. Accordingly, its use has been limited to the preparation of a wire or film. The silicone resin, on the other hand, also has a high final curing temperature, and a cured insulating material has defects in that its mechanical characteristics and electrical insulation characteristics are slightly inferior. As a resin for class H insulation, a resin using as a raw material a maleimide compound is known. Where the maleimide compound is used as the raw material, however, the resin produced by curing has a defect in that it is mechanically brittle and has few practical applications.

As a result of extensive research, the inventors have found that a composition consisting of a maleimide compound and an epoxy resin, when heat-cured in the presence of an aluminum compound such as aluminum trisacetyl acetonate as a curing catalyst, can provide a cured resin possessing favorable mechanical strength and excellent heat resistance. This curing, however, usually requires a long reaction period ranging from several hours to several tens of hours at 150°-250° C. Accordingly, as a result of further research on this point, it has now been found that, when a small amount of a curing accelerator such as a silane compound or a polysiloxane compound, each having a hydroxyl group, is added to a composition system consisting of a maleimide compound, an epoxy resin, and an aluminum compound, there is provided a curing composition that is stable at room temperature and has a long storage life. Furthermore, it is cured by the aid of a remarkable curing accelerating action at a temperature which is not so high and in a short time to provide a cured resin having no mechanical brittleness and having excellent heat resistance.

For example, a composition was prepared by the addition of 0.1 part by weight of aluminum trisacetylacetonate and 0.1 part by weight of a polysiloxane compound containing a hydroxyl group (trade name "SH 6018": product of Toray Silicone Co., Ltd.) to a composition system consisting of 80 parts by weight of Epikote 152 (trade name: Shell Chemical Company) and 20 parts by weight of N,N'-methylene-di-p-phenylene bismaleimide. This composition was dissolved in methyl ethyl ketone, and this solution was used to impregnate a mica sheet backed with a glass woven fabric. Then the sheet was dried at 50°-70° C. for a short time. The mica tape thus prepared was found to have a storage life of more than 3 months at room temperature and to gel for several minutes to several tens of minutes at 90°-110° C.

The object of the present invention is to provide an electrically insulated coil that be prepared at less cost and which possesses high heat resistance and mechanical strength as well as excellent electrical insulation characteristics.

In one aspect of the present invention, there is provided an electrically insulated coil which comprises a coil and a mica tape containing a resinous composition, wound around the coil; the resinous composition containing a maleimide compound, an epoxy resin, a curing catalyst consisting of an aluminum compound, and a curing accelerator selected from the group consisting of a silane compound having a hydroxyl group and a polysiloxane compound having a hydroxyl group; the curing catalyst and the curing accelerator being each in an amount of approximately 0.0001 to 5% by weight based on the total amount of the maleimide compound and the epoxy resin; and the resinous composition being cured by heating after the mica tape is wound around the coil.

The insulated coil may additionally contain a second resinous composition containing an epoxy resin and an acid anhydride, the second resinous composition being used to impregnate the mica tape wound around the coil and cured by heating together with the first resinous composition.

This invention can be more fully understood from the following detailed description when taken in conjunction with the accompanying drawings, in which.

Figure 1:
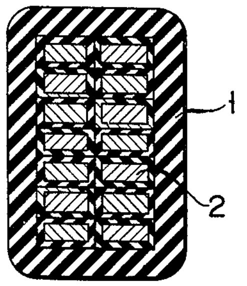
FIG. 1 is a cross-sectional view illustrating the electrically insulated coil of Example 1 in accordance with the present invention.

In accordance with the present invention, a maleimide compound to be used as a component for the first resinous composition may include a compound represented by the general formula;

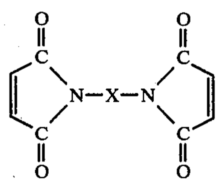

(wherein X is a divalent hydrocarbon group such as an alkylene group, a cycloalkylene group or a mono- or poly-cyclic arylene group, or a divalent hydrocarbon group bonded by a divalent atomic group such as $-CH_2-$, $-CO-$, $-SO_2-$ or $-CONH-$) and a maleimide compound obtainable by the reaction with maleic anhydride mixed polyamine represented by the general formula:

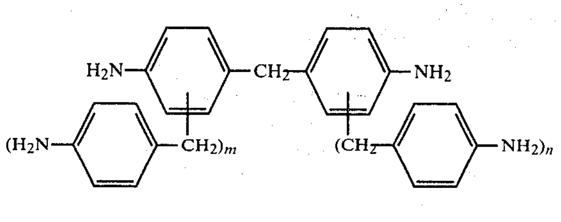

(wherein m and n are each 0 or integers between 1 and 4, inclusive.)

The maleimide compounds of this type may include, for example, N,N'-phenylene bismaleimide, N,N'-hexamethylene bismaleimide, N,N'-methylene-di-p-phenylene bismaleimide, N,N'-oxy-di-p-phenylene bismaleimide, N,N'-4,4'-benzophenone-bismaleimide, N,N'-p-diphenylsulfone maleimide, N,N'-(3,3'-dimethyl)methylene-di-p-phenylene bismaleimide, N,N'-(3,3'-diethyl)-methylene-di-p-phenylene bismaleimide, N,N'-metatoluene-dimaleimide and a reaction product of the mixed polyamine and maleic anhydride. They may also contain a maleimide compound prepared by the reaction of a polyamine with a maleic anhydride of which 60 mole percent or less is replaced by another anhydride.

As the other anhydride to be used in combination with maleic anhydride for the synthesis of the maleimide compound in accordance with the present invention, suitable examples are: 3(or 4)-methyltetrahydrophthalic anhydride, phthalic anhydride, tetrahydrophthalic anhydride, nadic anhydride, methylnadic anhydride, hexahydrophthalic anhydride, dodecylsuccinic anhydride, succinic anhydride, methylsuccinic anhydride, octadecylsuccinic anhydride or the like.

On the other hand, suitable examples of the polyamine compounds are: 4,4'-diaminodiphenylmethane, 4,4'-diaminodiphenyl ether, 4,4'-diaminodiphenylsulfone, 4,4'-diaminodiphenyl ketone, o(or m, p)-phenylenediamine, 3,3'-dimethyl-4,4'-diaminodiphenylmethane, 3,3'-diethyl-4,4'-diaminodiphenylmethane, 2,2'-bis(4-aminophenyl)-propane, 4,4'-diaminodiphenylsulfide, 1,5-diaminonaphthalene, o(or m, p)-xylenediamine, phenylindanediamine, 1,1'-bis(p-aminophenyl)-phthalene, 4,4'-methylene bis (2-chloroaniline), 1,3-bis(aminomethyl)cyclohexane, 1,4-diaminocyclohexane, 2,6-diaminopyridine, 2,5-bis(m-aminophenyl)-1,3,4-oxadiazole, 3,5-diamino-1,2,4-triazole, bis-p-(4-aminophenoxy)benzene and the like. The bismaleimide compounds may be employed singly or in a mixture of two or more compounds or replaced by a monomaleimide compound such as, for example, N-allylmaleimide, N-propylmaleimide, N-hexylmaleimide, N-phenylmaleimide or the like.

In accordance with the present invention, as the epoxy resins to be used as a component of the mica adhesives, suitable examples are: bisphenol A series epoxy resins; bisphenol F series epoxy resins; phenol novolak series epoxy resins; cresol novolak series epoxy resins, alicyclic epoxy resins; heterocycle-containing epoxy resins such as triglycidyl isocyanate or hydantoin epoxy; hydrogenated bisphenol A series epoxy resins; aliphatic epoxy resins such as propylene glycol dicresyl ether or pentaerythritol polyglycidyl ether; epoxy resins obtainable by the reaction of an aromatic, aliphatic or alicyclic carboxylic acid with epichlorohydrin; spirocycle-containing epoxy resins; glycidyl ether series epoxy resins obtainable by the reaction of an o-allylphenol novolak compound with epichlorohydrin; glycidyl ether series epoxy resins obtainable by the reaction of a diallyl bisphenol compound having allyl groups at the ortho position of each of the hydroxyl group of bisphenol A, or the like.

In accordance with the present invention, the proportion of the composition of the maleimide compound and the epoxy resin may be conveniently chosen depending upon the intended use, desired heat resistance or the like. Generally, it may be selected to be preferably 5 to 95% by weight of the maleimide compound and 95 to 5% by weight of the epoxy resin.

Furthermore, for the aluminum compounds to be used as a curing catalyst in the presence of the silane compound or the polysiloxane compound, each having a hydroxyl group, suitable examples are compounds represented by the general formula:

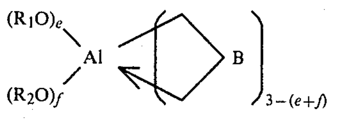

(in which each of $R_1$ and $R_2$ is independently an alkyl group, e and f are 0 or integers between 1 and 3, inclusive, such that the total of e+f does not exceed 3, and B is a ligand selected from the group consisting of compounds represented by the following formulas:

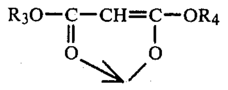

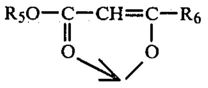

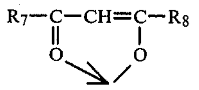

(wherein each of $R_3$–$R_8$ is an alkyl group).

Of these aluminum compounds, aluminum trisalkyl acetoacetate, aluminum trisacetylacetonate, aluminum alcoholate, aluminum acylate and the like are particularly useful, and they may be used in amounts of approximately 0.0001 to 5 parts by weight with respect to 100 parts by weight of the resinous component in accordance with the present invention.

The silane compounds or the polysiloxane compounds, each having a hydroxyl group, to be used in accordance with the present invention as a curing accelerator in the presence of the aluminum compound, may include, for example, a silane compound represented by the general formula:

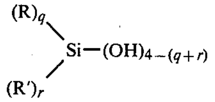

(wherein each of R and R' is independently an alkyl group, a phenyl group, an aralkyl group, a vinyl group or an allyl group and may be identical or different, and each of q and r is 0 or an integer between 1 and 3, inclusive, such that the total of q+r does not exceed 3) or a polysiloxane compound represented by the general formula:

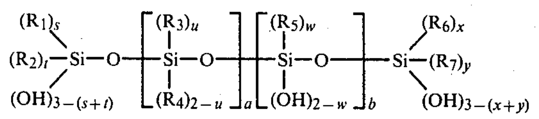

(wherein each of $R_1$-$R_7$ is a monovalent organosiloxane with or without, identically or differently, an alkyl group, a phenyl group, a vinyl group, an aralkyl group, an allyl group or a hydroxyl group; each of s, t, x and y is 0 or an integer between 1 and 2, inclusive, the sum s+t and the sum x+y not exceeding 2; each of u and w is 0 or an integer between 1 and 2, inclusive; and each of a and b is 0 or an integer of 1 or more). These organosilanol compounds preferably employed in amounts of at least 0.0001% by weight based on 100 parts by weight of the resinous components, or the total of the maleimide compound and the epoxy resin, in accordance with the present invention. They may be employed up to about 5% by weight to facilitate curing acceleration.

In accordance with the present invention, the radical polymerization initiators that may be employed if necessary may include, for example, benzoyl peroxide, cumene hydroperoxide, dicumyl peroxide, azobisisobutyronitrile, methyl ethyl ketone peroxide, tert-butyl perbenzoate and the like. They may be conveniently chosen depending upon the molding conditions and the object of use and may be employed preferably in amounts of about 0.05 to 3 parts by weight based on 100 parts by weight of the resinous composition in accordance with the present invention.

Furthermore, in order to enhance compatibility between the maleimide compounds, the epoxy resins and the silane compounds or the polysiloxane compounds, furfuryl alcohol may be added if necessary. The amount of furfuryl alcohol to be added is preferably selected to be less than 0.4 equimolar equivalent based on the equimolar equivalent of the active double bonds of the maleimide compound. Where furfuryl alcohol is selected to be more than 0.4 equimolar equivalent, the active double bonds of the maleimide compound may react with the furfuryl alcohol so that the heat resistance when cured will be decreased.

The mica tapes to be employed in accordance with the present invention may include, for example, a flake mica tape obtainable by binding a flake mica sheet to a backing such as a glass cloth, a heat-resistant film, a heat-resistant paper sheet or the like together with the above-mentioned adhesive; or by binding a compound mica sheet to a backing material such as a glass cloth, a heat-resistant film, a heat-resistant paper sheet or the like and impregnating it with the above-mentioned adhesive. The compound mica tape has less variation in dielectric breakdown voltage and is available at a low cost and is thus generally suitable. Suitable examples of the compound mica sheets or tapes are: a compound mica of a non-burned type obtainable by mechanically peeling off flakes from soft or hard mica by means of, for example, a water-jet; or a compound mica of a burned type obtainable by peeling off mica flakes through elimination of crystalline water of the mica by the application of high temperatures. These mica tapes have different apparent densities so that the optimum amount of mica tapes to be bonded may vary.

Suitable examples of the epoxy resin to be included in the second resinous composition for impregnation of the mica tape wound upon a coil are: bisphenol A series epoxy resins such as DER 332 (trade name: Dow Chemical Company), GY 290 or GY 255 (trade names: Ciba-Geigy, Limited), Epikote 825 (trade name: Shell Chemical Company) or the like; bisphenol F series epoxy resins such as Epikote 807 (trade name: Shell Chemical Company), Epiclon 830 (trade name: Dainippon Ink K.K.) or the like; epoxy resins resulting from alicyclic compounds, such as Chissonox 221 (trade name: Chisso Company), Epikote 190 (trade name: Shell Chemical Company), Showdain 540 (trade name: Showa Denko K.K.) or the like; and hydantoin series epoxy resins such as polyepoxides, e.g., CY 350 (trade name: Ciba-Geigy, Limited), or the like. If necessary, a diluent may be added. Examples of the diluents are: monoepoxide resins such as octylene oxide, butylglycidyl ether, styrene oxide, phenylglycidyl ether, p-butylphenol glycidyl ether, cresylglycidyl ether, glycidyl methacrylate, allylglycidyl ether, cyclohexene monoxide. Since the diluents generally decrease the viscosity but tend to decrease characteristics, the diluents should be restricted to below 30% by weight of the polyepoxide.

Examples of the acid anhydride to be included in the impregnating resins may include, for example, hexahydrophthalic anhydride, tetrahydrophthalic anhydride, 3(or 4)methyl-tetrahydrophthalic anhydride, nadic anhydride, methyl-nadic anhydride, dodecylsuccinic anhydride, succinic anhydride, methylsuccinic anhydride, octadecylsuccinic anhydride and the like. They may be employed singly or in admixture with each other.

The heat-resistant resinous compositions for the above-mentioned adhesives for mica tapes, in accordance with the present invention, vary their viscosities depending upon their compositions and may be used to impregnate, in the form of so-called non-solvent type adhesives, the mica sheets. Generally, however, they readily dissolve in a solvent such as methylethylketone, dioxane, tetrahydrofuran, toluene, xylene or the like. Thus, the mica tapes may be immersed in a solution of the adhesive in a solvent and dried to provide mica tape products. The heat-resistant resinous compositions thus prepared are stable at room temperature and provide a long pot life. Furthermore, upon heat-curing of the impregnated resins after impregnation, gelation occurs in a short period of time owing to the remarkable reaction-accelerating effect produced by the small amount of the aluminum compound and the polysiloxane compound in the mica tape adhesives. Accordingly, even impregnating resins having a low viscosity can permit little leakage of the resin from the mica tape, so that an impregnating resin having both a low viscosity and a long pot life can be employed.

The resinous components for use in bonding mica in accordance with the present invention have favorable compatibility with each other and good wettability with the mica flakes and backing material so that, when thermally cured, they may provide a uniform insulating structure having no voids. Furthermore, the cured insulation structure has excellent heat resistance, mechanical characteristics and electrical insulation characteristics so that it can provide a good electrically insulated coil.

The following examples further illustrate the present invention in more detail.

EXAMPLE 1

A maleimide compound was prepared as follows:

In a reaction vessel were charged 500 parts by weight of maleic anhydride and 650 parts by weight of dimethylformamide, and the mixture was dissolved homogeneously. To this homogeneous mixture was added, with stirring, a solution of 496 parts by weight of 4,4'-diaminodiphenylmethane in 300 parts by weight of dimethylformamide over a period of 30 minutes. The mixture was heated at 60°-70° C. for 1 hour to provide an amic acid compound. To this reaction system were then added 637.25 parts by weight of acetic anhydride and 82 parts by weight of sodium acetic anhydride, and the mixture was heated at 70° C. for 2.5 hours and then cooled to 8° C. This cool solution was then added dropwise to ice-cold water, thereby forming a precipitate material which was, in turn, washed repeatedly with ice-cold water and dried under reduced pressure to yield bismaleimide A as the objective maleimide compound at a yield at 84%.

Then, 15 parts by weight of bismaleimide A (the objective maleimide compound thus obtained), 25 parts by weight of Epikote 1001 (trade name: Shell Chemical Company, a bisphenol A series epoxy resin), 60 parts by weight of Epikote 152 (trade name: Shell Chemical Company, a novolak series epoxy resin) and 2.0 parts by weight of SH-6018 (trade name: Toray Silicone K.K., a polysiloxane compound) were dissolved at 60°-70° C. in methylethylketone to provide a 55% by weight solution. To this solution were added 2.6 parts by weight of aluminum trisethylacetoacetate, 2.6 parts by weight of TSR-160 (trade name: Toshiba Silicone Company, a polysiloxane compound having a hydroxyl group) and 40 part by weight of dicumyl peroxide and the mixture was mixed to give a homogeneous solution. This solution was then used to impregnate a compound mica sheet about 0.1 mm thick of dehydrated type muscovite, backed with a 35 μm coarse glass cloth. The impregnated sheet was dried at 60°-70° C. for 5-20 minutes to provide a prepreg mica sheet containing about 45% adhesive. This prepreg mica sheet was then cut by means of a slitter into tapes having a width of 30 mm. These mica tapes were found to have a storage life of more than 3 months at room temperature.

As shown in FIG. 1, one of these prepreg mica tapes (1) was wound around a coil (2) in five turns with each turn half-lapping with respect to the adjacent turn and molded at 150° C. for 1 to 2 hours under a pressure of 25 $kg/cm^2$ by means of a press or molder (not shown). The molded coil was then heat-cured in an oven heated to 150° C. for about 10 hours to provide an electrically insulated coil.

Figure 2:
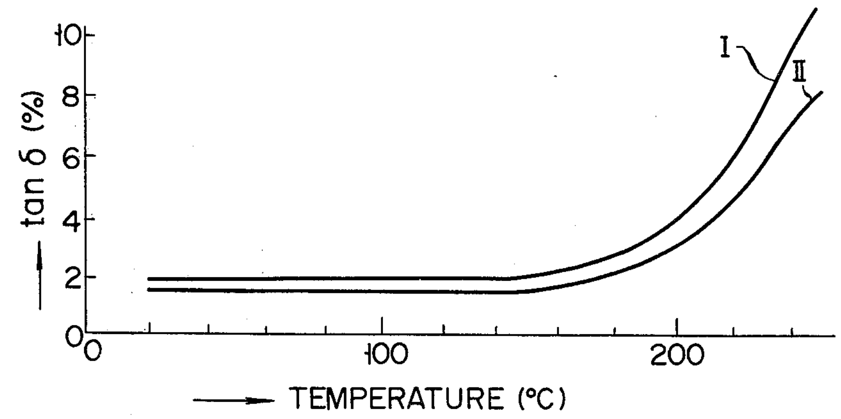
FIG. 2 is a graph illustrating the temperature-tan δ characteristic of the electrically insulated coil of Example 1.

The electrically insulated coil thus obtained exhibited a high dielectric breakdown strength of greater than 30 KV/mm as measured by the short-time voltage rise method, and a flexural strength of 15 $kg/mm^2$, a value higher than that of conventional silicone mica insulation. Although the electrically insulated coil was cured at a relatively low temperature and for a short time, the coil allowed only a small dielectric loss at high temperatures as indicated by the fact that tan δ in curve I of FIG. 2 was within 10% at 180° C. and 1 KV/mm. This electrically insulated coil was heated at 225° C. for 1,000 hours to provide tan J vs. temperature characteristics as indicated by the curve II in FIG. 2 and then tested for dielectric breakdown voltage and flexural strength. It is also apparent from the curve II shown in FIG. 2 that no remarkable increase in the tan δ characteristic at 1 KV/mm was observed. As a result, it was found that there was little variation between the initial stage (curve I) and the heated condition (curve II). After the dielectric breakdown test, the insulating layer was decomposed and visually observed. As a result, remarkable delamination was not found in the insulating layer had fallen off and no carbonization of the resin was seen; further, the electrically insulated coil had excellent heat-resistant and mechanical characteristics.

EXAMPLE 2

In a reaction vessel equipped with a stirrer, a thermostat and a cooling tube were charged 900 parts by weight of polyamine MDA-150 (trade name: Mitsui Nisso Polyurethane K.K.) having an amino group content of 15.9% and a viscosity of 16,000 centipoises, 400 parts by weight of sodium acetate, and 1,300 parts by weight of dimethylformamide. The mixture was heated with stirring at 60°-70° C. for 1 hour and then cooled to room temperature. To this mixture, 900 parts by weight of maleic anhydride were added with the temperature maintained below 40° C., and the mixture was stirred for 1 hour after completion of the addition. The mixture was then heated to 80°-90° C. and allowed to react for 2 hours. After the reaction system was cooled to room temperature, it was dropwise added to a 6- to 8-fold amount of water, thereby precipitating bismaleimide as a reaction product, which was in turn washed twice with warm water of 50° C. and once with cool water. This product was then cleansed and vacuum dried to yield bismaleimide B as the maleimide compound.

The procedures of Example 1 was followed with the exception that the bismaleimide B, the maleimide compound thus obtained, was used in place of the bismaleimide A of Example 1 to give a resinous solution. This resinous solution was coated on a compound mica sheet obtained by backing a mica paper about 0.1 mm thick of non-dehydrated type phlogopite, with a 35 μm thick coarse glass cloth. The sheet was dried in an oven heated to 70° to 90° C. to yield a B-stage prepreg mica sheet. The mica sheet was then cut by means of a slitter into tapes having a width of 30 mm. These tapes were found to have a storage life of longer than 3 months at room temperature.

Figure 3:
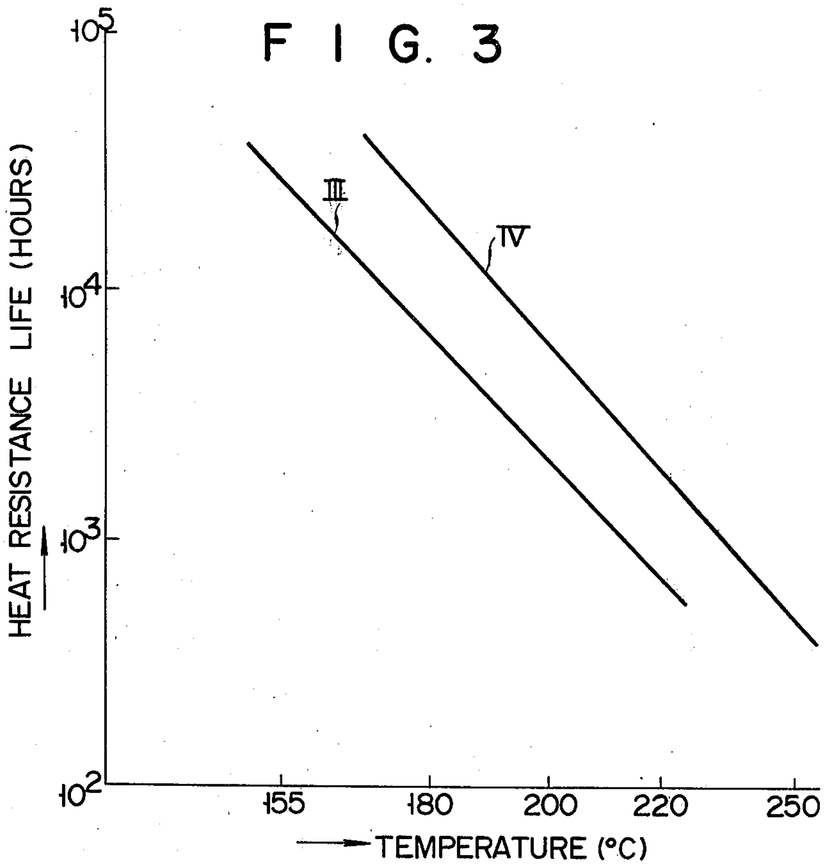
FIG. 3 is a graph illustrating a comparison in heat resistant life between the coil of Example 2 of the present invention and a conventional class F insulated coil.

Using one of these prepreg mica tapes, the procedures of Example 1 were repeated to provide an electrically insulated coil. This electrically insulated coil was found to be superior in the tan δ characteristic which was as low as 3.5% at 180° C. It was also found to be superior in its function as class H insulation because its heat resistance life was longer (as illustrated by line IV of FIG. 3) than that of conventional class F insulation (as illustrated by line III thereof) when determined by the Motorette test according to IEEE standards 275.

Furthermore, the mica tape adhesive compositions to be employed in accordance with the present invention have good compatibility with each of the components and with the epoxy impregnating resins so that, when thermally cured, a homogeneous insulation structure can be provided. In addition, since the cured resins can bond securely to mica flakes and to backing material, the insulated structure possesses excellent heat resistance, and mechanical and electrical insulation characteristics. The electricaly insulated coils according to the present invention are thus composed of materials available at relatively low cost, are capable of being readily handled, and have excellent characteristics as well.

EXAMPLE 3

In a reaction vessel equipped with a stirrer, a thermostat, and a cooling tube were charged 900 parts by weight of polyamine MDA-150 (trade name: Mitsui Nisso Polyurethane Company) having an amino group content of 15.9% and a viscosity of 16,000 centipoises, 400 parts by weight of sodium acetate and 1,300 parts by weight of dimethylformamide. The mixture was then heated with stirring at 60°-70° C. and maintained at this temperature for 1 hour. After the mixture was cooled to room temperature, 900 parts by weight of maleic anhydride were added by maintaining the temperature at not more than 40° C., then stirring for 1 hour after the completion of the addition. The mixture was heated to 80°-90° C. for 2 hours, and then the reaction system was cooled to room temperature. The mixture was added dropwise to water in an amount of 6-8 times the volume of the mixture, thereby yielding bismaleimide as a precipitate of the reaction product. This product was washed two times with warm water of 50° C. and then once with cool water, cleansed and then dried in vacuo to provide bismaleimide A as the maleimide compound.

In addition, another type of maleimide compound was prepared in the following manner. Into a reaction vessel were charged 500 parts by weight of maleic anhydride and 650 parts by weight of dimethylformamide. These were dissolved homogeneously. To this was added a solution of 496 parts by weight of 4,4'-diaminodiphenylmethane in 300 parts by weight of dimethylformamide with stirring over a period of 30 minutes. The mixture system was heated to 60°-70° C. for 1 hour to yield an amic acid compound. To this reaction system were then added 637.25 parts by weight of acetic anhydride and 82 parts by weight of sodium acetic anhydride, and the mixture was then heated at 70° C. for 2.5 hours. After being cooled to 8° C., this solution was added dropwise to ice-cold water, thereby precipitating a product. The precipitated product was then washed repeatedly with ice-cold water and dried under reduced pressure to yield bismaleimide B as the objective maleimide compound, at a yield of 84%.

Using these bismaleimides A and B as the maleimide compounds, eleven resinous compositions, including the Comparative Example, were prepared having the compositions (parts by weight) illustrated in Table 1. The other components used were as follows: alicyclic epoxy resins, e.g., "Chissonox 221" (trade name: Chisso Company) and "Shodain 540" (trade name: Showa Denko K.K.); bisphenol F series epoxy resins, e.g., "Epiclon 830" (trade name: Dainippon Ink K.K.); bisphenol A series epoxy resins, e.g., Epikote 808 and Epikote 1001 (trade names: Shell Chemical Company); novolak series epoxy resins, e.g., DEN 438 and DEN 431 (trade names: Dow Chemical Company); siloxane compounds containing hydroxyl groups, e.g., "SH 6018" (trade name: Toray Silicone Company) and "TSR-160" (trade name: Toshiba Silicone Company); and aluminum triethylacetoacetate, dicumylperoxide, furfuryl alcohol and the like.

TABLE 1

| | Samples | | | | | | | | | | Comparative |
|---|---|---|---|---|---|---|---|---|---|---|---|
| Components | B-1 | B-2 | B-3 | B-4 | B-5 | B-6 | B-7 | B-8 | B-9 | B-10 | Example |
| Bismaleimide A (maleimide compound) | 15 | 10 | 20 | 30 | 45 | — | — | 50 | 15 | — | 10 |
| Bismaleimide B (maleimide compound) | — | — | — | — | — | 50 | 50 | — | — | 15 | — |
| Chissonox 221 | 85 | 20 | — | — | 20 | — | 33.3 | — | — | — | — |
| Shodain 540 | — | — | — | 70 | 35 | 14.3 | — | 14.3 | — | — | 20 |
| Epiclon 830 | — | — | 80 | — | — | — | — | — | — | — | — |
| Epikote 808 | — | 70 | — | — | — | — | — | — | — | — | 70 |
| Epikote 828 | — | — | — | — | — | — | — | — | — | 30 | — |
| Epikote 1001 | — | — | — | — | — | 10.7 | — | 10.7 | 25 | — | — |
| DEN 431 | — | — | — | — | — | 17.8 | 16.7 | 17.8 | 60 | — | — |
| DEN 438 | — | — | — | — | — | — | — | — | — | 70 | — |
| SH 6018 (Siloxane compound) | 0.001 | 5 | 0.5 | 0.5 | 1.0 | 7.2 | 0.1 | 7.2 | 2.0 | 1.0 | — |
| TSR 160 (Siloxane compound) | — | — | — | — | — | 0.09 | — | 0.09 | — | — | — |
| Aluminum triethyl-acetoacetate | 0.1 | 0.05 | 1.0 | 0.001 | 0.1 | 0.09 | 0.05 | 0.09 | 1.0 | 1.0 | 0.05 |
| Dicumyl peroxide | — | — | 1 | — | — | 1.4 | — | 1.4 | 0.5 | 0.5 | — |
| Furfuryl alcohol | — | — | 2 | 4 | 8 | — | — | — | — | — | — |

The resinous compositions thus prepared were diluted, if necessary, with a solvent such a methylethylketone, xylene or the like and then used to impregnate a mica sheet backed with a backing member such as a glass cloth or "Kapton" film (trade name: E. I. du Pont de Nemours & Co., Inc.) to provide mica tapes having the compositions indicated in Table 2.

TABLE 2

| | MT - 1 | MT - 2 | MT - 3 | MT - 4 | MT - 5 |
|---|---|---|---|---|---|
| Mica | Dehydrated type muscovite mica paper | Dehydrated type muscovite mica paper | Non-dehydrated type muscovide mica paper | Non-dehydrated type phlogopite mica paper | Muscovite type mica splitting |
| Backing Member | 35 μ glass woven fabric | 25 μ Capton film | 35 μ glass woven fabric | 35 μ glass woven fabric | 35 μ glass woven fabric |
| Amount of Mica ($g/m^2$) | 160 | 160 | 205 | 205 | 210 |
| Amount of Adhesive (%) | 17 | 15 | 12 | 12 | 10 |

TABLE 2-continued

| | MT - 1 | MT - 2 | MT - 3 | MT - 4 | MT - 5 |
|---|---|---|---|---|---|
| Thickness (mm) | 0.16 | 0.16 | 0.17 | 0.17 | 0.17 |

The resinous compositions of non-solvent type were prepared with the compositions indicated in Table 3 from an epoxy resin consisting of one or two of the impregnating resins including bisphenol F series epoxy resins, e.g., "Epiclon 830" (trade name: Dainippon Ink K.K.); bisphenol A series epoxy resins, e.g., "DER 332" (trade name: Dow Chemical Company); and alicyclic epoxy resins, e.g., "Chissonox 221" (trade name: Chisso Company) and "Shodain 540" (trade name: Showa Denko K.K.); reactive diluents including butylglycidyl ether, and phenylglycidyl ether; and an acid anhydride curing agent including "HN 2200" (trade name: Hitachi Kasei K.K.) or "Epiclon B 570" (trade name: Dainippon Ink K.K.).

TABLE 3

| | Samples | | | | | | |
|---|---|---|---|---|---|---|---|
| | I - 1 | I - 2 | I - 3 | I - 4 | I - 5 | I - 6 | I - 7 |
| Chissonox 221 | — | — | — | 42.5 | — | — | — |
| Shodain 540 | 45.3 | 0 | 28.5 | — | 21.7 | — | — |
| DER 332 | — | — | — | — | — | 46.0 | — |
| Epiclon 830 | — | 45.8 | 28.5 | — | 21.7 | — | 58.0 |
| Butylglycidyl ether | — | — | — | 11.0 | 8.0 | 8.0 | 7.5 |
| Phenylglycidyl ether | 5.0 | 8.1 | 5.2 | — | — | — | — |
| HN 2200 | — | — | — | 46.5 | 48.6 | — | 39.5 |
| Epiclon B 570 | 49.7 | 46.1 | 47.8 | — | — | 46.0 | — |
| Viscosity at 25° C. (poises) | 0.77 | 1.55 | 1.13 | 0.65 | 0.70 | 0.94 | 1.1 |

The mica tape 1 thus prepared was wound upon a coil 2 in five turns with each turn half-lapping with respect to the adjacent turn as shown in FIG. 1, and the coil was put in a model iron core. The iron core was then placed in a vacuum impregnating tank which was then reduced to 1 mmHg for 3 hours at room temperature. The above-mentioned resin was charged into the tank under reduced pressure and then subjected to a pressure of 5 kg/cm$^2$ (gauge pressure). The coil was then taken out of the vacuum impregnating tank and heat-cured in an oven at 150° C. for 15 hours.

Figure 4:
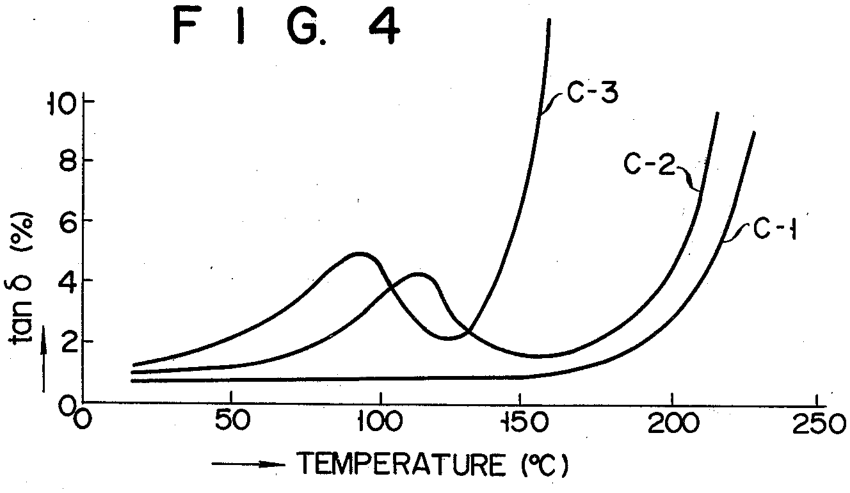
FIG. 4 is a graph illustrating the temperature-tan δ characteristic at a voltage of 1 KV/mm of the electrically insulated coil of Example 3 of the present invention.

FIG. 4 shows representative examples of the tan $\delta$ characteristic of the electrically insulated coils thus obtained as a function of temperature when measured at a voltage of 1 KV/mm. In FIG. 4, the curve C-1 shows the tan $\delta$ characteristic of the electrically insulated coil prepared from the mica tape "MT-1" of Table 2 using the adhesive "B-10" of Table 1, and the impregnating resin "I-4" of Table 3; the curve C-2 indicates the tan $\delta$ characteristic of the electrically insulated coil prepared from the mica tape "MT-4" of Table 2 using the adhesive "B-8" of Table 1, and the impregnating resin "I-3" of Table 3; and the curve C-3 shows the tan $\delta$ characteristic of the electrically insulated coil prepared from the mica tape "MT-1" using the adhesive of the Comparative Example of Table 1, and the impregnating resin "I-4" of Table 3. When the adhesive of the Comparative Example was used, the curing conditions as applied herein were found to be insufficient. It was further noted that the electrically insulated coils prepared from the combination of the other components provided in each case curved lines similar to the curved lines C-1 or C-2. The electrically insulated coils thus obtained exhibited in all cases a tan $\delta$ of lower than 10% at 180° C. and high dielectric breakdown strength of 25 KV/mm or higher. They were also measured for insulation breakdown voltage at ordinary temperature after heat aging at 220° C. for 100 days. They provided in each case dielectric breakdown strength of 20 KV/mm or higher, a smaller decrease in dielectric breakdown strength than that of the Comparative Example coil. Their flexural strengths decreased to 7.5 kg/mm$^2$ or higher after a 100-day heating at 220° C., as compared to 10 kg/mm$^3$ or higher at the initial stage.

Thus, the electrically insulated coils in accordance with the present invention show less electrical loss and less decrease in insulation characteristics after heating at high temperatures for a long period of time.

It was further found that the mica tape backed with Kapton film had a higher dielectric breakdown strength and a smaller variation therein than the mica tape backed with a glass cloth. With respect to mica, the variation in breakdown voltage became greater in this order; mica splitting, mica paper of the non-dehydrated type, and mica paper of the dehydrated type. It was also found that, with respect to deterioration due to heat aging at 220° C. for 100 days, insulated coils employing mica splitting provided a greater decrease in breakdown voltage than coils employing mica paper.

In the above-mentioned examples, a description was made with respect to so-called post-impregnation coils which were cured after the iron cure and the coil were subjected as a unit to vacuum impregnation. However, the present invention is not limited to this mode of insulation and can be applied to a coil which is prepared by vacuum-impregnating the coil alone and then curing it. Thus, the present invention should certainly be construed as including within the scope thereof every variation and modification, as long as they do not deviate from the object of the present invention.

In the above-mentioned examples, in each case examples using the prepreg tapes of the solvent type alone were described; however, it is possible to use prepreg tape of the non-solvent type by choosing the compositions in an appropriate manner. Other kinds of non-dehydrated muscovite mica sheets, splitting mica and the like may also be used as the mica, and heat-resistant films, heat-resistant paper or the like also may be employed as a backing material. It should, of course, be understood that every variation and modification can be applied to the present invention, unless they deviate from the object of the present invention.

As has been described hereinabove, the prepreg mica tapes to be employed in accordance with the present invention possess a long storage life at room temperature and at the same time they are cured at a relatively low temperature in a short time, so that the electrically insulated coils prepared therefrom are economic, as well as having a high resistance to heat, good mechanical strength, and excellent electrical insulation characteristics. Accordingly, they are suitable as class H insulation.

What is claimed is:

1. An electrically insulated coil, comprising:

a coil; and a mica tape containing a resinous composition wound upon said coil, said resinous composition containing a maleimide compound, an epoxy resin, a curing catalyst consisting of an aluminum compound of the formula:

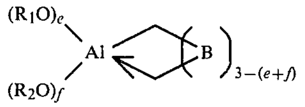

wherein $R_1$ and $R_2$ independently are alkyl, e and f are zero or integers from 1 to 3 such that the value of e+f does not exceed 3 and B is a ligand selected from the group consisting of

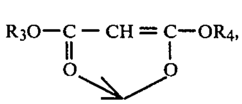, 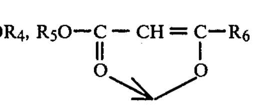 and

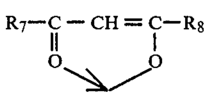

wherein each $R_3$–$R_8$ radical is alkyl, and a curing accelerator selected from the group consisting of a silane compound of the formula:

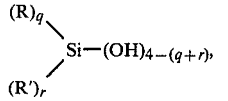

wherein each R and R' radical independently is alkyl, phenyl, aralkyl, vinyl or allyl, q and r are each O or an integer of 1 to 3 with the sum of q and r not exceeding 3 and a polysiloxane compound of the formula:

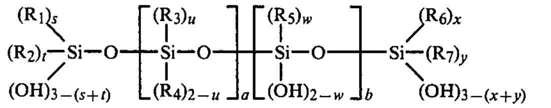

wherein each of the radicals $R_1$–$R_7$ independently is a monovalent organosiloxane each optionally substituted by alkyl, phenyl, vinyl, aralkyl, allyl or hydroxyl, each of s, t, x and y being 0, 1 or 2, the sum of s and t and the sum of x and y not exceeding 2, each of u and w being 0, 1 or 2 and each of a and b being 0 or 1 or more;

said curing catalyst and said curing accelerator each being present in an amount of approximately 0.001 to 5% by weight based on the total amount of said maleimide compound and said epoxy resin; and curing said resinous composition by heating after said mica tape is wound around the coil.

2. The electrically insulated coil as claimed in claim 1, further containing a second resinous composition comprising an epoxy resin and an acid anhydride, said second resinous composition impregnating said mica tape after said mica tape is wound around the coil, and being heat-cured together with said first resinous composition.

3. The electrically insulated coil as claimed in claim 1 or 2, wherein the composition containing said maleimide compound and said epoxy resin includes said maleimide compound in the amount of approximately 5 to 95% by weight and said epoxy resin in the amount of approximately 95 to 5% by weight.

4. The electrically insulated coil as claimed in claim 2, wherein said mica tape is forcibly impregnated with said second resinous composition by vacuum/pressure impregnation.

5. The electrically insulated coil as claimed in claim 1 or 2, wherein said mica tape is prepared from a prepreg mica sheet containing said first resinous composition by cutting said mica sheet into a tape.

6. The electrically insulated coil as claimed in claim 1 or 2, wherein said first composition further contains from 0.05 to 3% by weight of a radical polymerization initiator.

7. The electrically insulated coil as claimed in claim 1, wherein said maleimide compound is a compound of the formula:

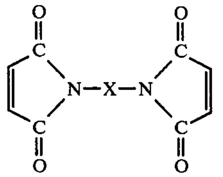

wherein X is a divalent hydrocarbon such as an alkylene group, a cycloalkylene group, a mono- or poly-cyclic arylene group, or a divalent hydrocarbon group bonded in the molecule by a divalent group selected from the group consisting of $—CH_2—$, $—CO—$, $—SO_2—$ or $—CONH—$.

8. The electrically insulated coil as claimed in claim 1, wherein said maleimide compound is a compound prepared by the reaction of maleic anhydride with a polyamine of the formula:

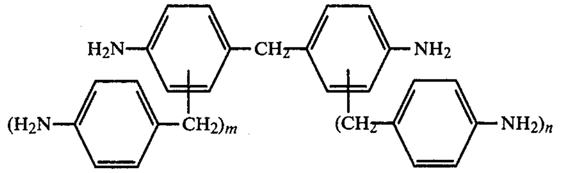

wherein m and n are each 0 or an integer of 1 to 4.

9. The electrically insulated coil as claimed in claim 1, wherein said epoxy resin is a member selected from group consisting of a bisphenol A epoxy resin, a bisphenol F epoxy resin, a phenol novolak epoxy resin, a cresol novolak epoxy resin, an alicyclic epoxy resin, a heterocycle group containing epoxy resin, a hydrogenated bisphenol A epoxy resin, a aliphatic epoxy resin, an epoxy resin obtained by reacting an aromatic, aliphatic or alicyclic carboxylic acid with epichlorohydrin, a spirocycle group containing epoxy resin, a glycidyl ether epoxy resin obtained by reacting an o-allylphenol novolak compound with epichlorohydrin and a glycidyl ether epoxy resin obtained by reacting a diallyl bisphenol compound having ortho allyl groups relative to the hydroxyl groups of bisphenol A.

10. The electrically insulated coil as claimed in claim 1, wherein said resinous composition further contains furfuryl alcohol in an amount of less than 0.4 molar equivalent based on 1 molar equivalent of active double bonds in the maleimide compound.

* * * * *